US012719868B2

(12) United States Patent
Lee et al.

(10) Patent No.: US 12,719,868 B2
(45) Date of Patent: Aug. 25, 2026

(54) METHOD, APPARATUS, AND COMPUTER-READABLE RECORDING MEDIUM FOR CONTROLLING ACCESS TO REMOTE SYSTEM IN HOME NETWORK ENVIRONMENT

(71) Applicant: SGA Solutions Co.,Ltd., Seoul (KR)

(72) Inventors: Ki Uk Lee, Seongnam-si (KR); Se Yun Kim, Namyangju-si (KR); Jae Hyeok Park, Seoul (KR)

(73) Assignee: SGA Solutions Co., Ltd., Seoul (KR)

( * ) Notice: Subject to any disclaimer, the term of this patent is extended or adjusted under 35 U.S.C. 154(b) by 413 days.

(21) Appl. No.: 18/337,179

(22) Filed: Jun. 19, 2023

(65) Prior Publication Data

US 2024/0171577 A1 May 23, 2024

(51) Int. Cl.
*H04L 9/40* (2022.01)

(52) U.S. Cl.
CPC .......... *H04L 63/10* (2013.01); *H04L 63/0227* (2013.01); *H04L 63/20* (2013.01)

(58) Field of Classification Search
None
See application file for complete search history.

(56) References Cited

U.S. PATENT DOCUMENTS 5,944,794 A * 8/1999 Okamoto ............ G06F 21/6218 709/219
6,131,120 A * 10/2000 Reid .................. H04L 63/0823 709/225
6,233,616 B1 * 5/2001 Reid .................. H04L 63/0823 709/227
6,658,091 B1 * 12/2003 Naidoo ................. H04M 11/04 379/37

(Continued)

FOREIGN PATENT DOCUMENTS

KR 10-2004-0004944 1/2004
KR 10-2018-0003132 1/2018
KR 10-2345265 12/2021

OTHER PUBLICATIONS

Kim et al "Access Right Assignment Mechanisms for Secure Home Networks," pp. 175-186 (Year: 2011).*

(Continued)

*Primary Examiner* — Luu T Pham
*Assistant Examiner* — James J Wilcox

(57) ABSTRACT

Access of a home network terminal to a work server in a telecommuting environment is effectively managed to maintain security of the terminal. According to one embodiment of the present invention, a method for controlling access to a remote system in a home network environment includes: an access request reception step of receiving a request signal according to a network protocol when an access request for a remote server, which is an access target, is performed by (Continued)

a terminal on a home network; a security environment inspection step of checking the security environment of the terminal through a host sensor for each protocol that has received the request signal through the access request reception step; and an access permission step of managing access to the remote server according to the security environment checked according to a result of performing the security environment inspection step.

3 Claims, 7 Drawing Sheets

(56) References Cited

U.S. PATENT DOCUMENTS 6,845,451 B1 * 1/2005 Anand .................... H04L 67/30 726/5
7,096,495 B1 * 8/2006 Warrier ............... H04L 63/0272 709/224
7,139,790 B1 * 11/2006 Wang .................. H04L 63/1408 714/4.11
7,475,243 B2 * 1/2009 Karaoguz ........... H04L 12/2832 713/168
7,788,700 B1 * 8/2010 Feezel ................. H04L 63/1416 713/168
8,201,237 B1 * 6/2012 Doane ..................... H04L 67/52 713/153
8,245,129 B2 * 8/2012 Wilkinson ................ G06F 8/61 715/236
8,539,554 B2 * 9/2013 Hirano ................ H04L 12/4633 726/4
8,843,643 B2 * 9/2014 Larson ................ H04L 63/0485 709/227
8,856,869 B1 * 10/2014 Brinskelle ........... H04L 63/0823 726/2
8,914,526 B1 * 12/2014 Lindquist ............... G08B 25/10 709/229
8,943,201 B2 * 1/2015 Larson ................ H04L 63/1491 709/227
9,191,365 B2 * 11/2015 Orr ......................... H04L 63/08
9,232,399 B2 * 1/2016 Tipton .................. H04L 67/306
9,400,875 B1 * 7/2016 Barraclough ........... H04L 67/63
9,438,567 B1 * 9/2016 Barraclough ......... H04L 63/108
9,479,426 B2 * 10/2016 Munger .............. H04L 63/0272
9,621,579 B2 * 4/2017 Casaburi ............... H04L 63/145
9,756,075 B1 * 9/2017 Gopalakrishna .... H04L 63/1425
9,807,094 B1 * 10/2017 Liu ....................... H04L 63/102
9,860,283 B2 * 1/2018 Munger .............. H04L 63/1458
10,051,001 B1 * 8/2018 Ashley .................. H04L 63/083
10,079,839 B1 * 9/2018 Bryan .................... G05B 15/02
10,326,796 B1 * 6/2019 Varadarajan ........ H04L 63/1425
10,333,901 B1 * 6/2019 Bauman .................. H04L 63/20
10,362,057 B1 * 7/2019 Wu ..................... H04L 63/1408
10,432,616 B2 * 10/2019 Von Bokern ............ H04L 63/20
10,567,387 B1 * 2/2020 Trinh .................... H04L 63/101
10,609,030 B1 * 3/2020 Newstadt ............ H04W 12/122
10,630,501 B2 * 4/2020 Ansari .................. H04L 51/046
10,924,496 B1 * 2/2021 Gu ........................ H04L 63/107
10,972,477 B1 * 4/2021 McCorkendale ... H04L 63/1433
10,972,503 B1 * 4/2021 Mohan .................... H04L 63/14
11,057,409 B1 * 7/2021 Bisht ................... H04L 63/1441
11,102,027 B2 * 8/2021 Scalisi ..................... G08B 3/10
11,122,040 B1 * 9/2021 Sun ..................... H04L 63/0876
11,128,665 B1 * 9/2021 Sokolov .............. H04L 63/1408
11,184,224 B2 * 11/2021 Johnson ................ H04L 63/105
11,283,768 B1 * 3/2022 Li ....................... H04L 63/0245
11,323,454 B1 * 5/2022 Li ....................... H04L 63/0421
11,329,979 B1 * 5/2022 Prasad ................ H04L 63/0861
11,374,903 B1 * 6/2022 Li ....................... H04L 63/0227
11,381,686 B2 * 7/2022 Scalisi ................ H04L 12/2825
11,641,373 B1 * 5/2023 Sanchez ................ H04W 12/02 726/24
11,657,815 B2 * 5/2023 Tran ........................ G10L 25/84 704/233
12,081,517 B2 * 9/2024 Brecl .................. H04L 12/4633
12,159,071 B2 * 12/2024 Minetomo ............ G06F 3/1222
12,380,418 B2 * 8/2025 Cella ...................... B33Y 50/02
2002/0029350 A1 * 3/2002 Cooper ................. H04L 65/403 705/1.1
2003/0054798 A1 * 3/2003 Kobayashi .......... H04L 63/0272 455/411
2003/0149796 A1 * 8/2003 Emerson ................. H04L 63/10 713/1
2003/0163728 A1 * 8/2003 Shaw .................. H04L 63/0272 726/12
2003/0177389 A1 * 9/2003 Albert ..................... H04L 63/20 726/1
2003/0186679 A1 * 10/2003 Challener ............. H04W 12/12 455/410
2003/0200548 A1 * 10/2003 Baran ................ H04N 21/4347 348/E7.071
2004/0003051 A1 * 1/2004 Krzyzanowski .... H04L 12/2838 709/217
2004/0003073 A1 * 1/2004 Krzyzanowski .... H04L 12/2805 375/E7.019
2004/0038667 A1 * 2/2004 Vance, Jr. ............... H04L 63/10 455/410
2004/0088575 A1 * 5/2004 Piepho ................ H04L 63/1408 713/168
2004/0107360 A1 * 6/2004 Herrmann ............... H04L 63/20 726/1
2004/0225878 A1 * 11/2004 Costa-Requena ....... H04L 63/08 713/150
2004/0250130 A1 * 12/2004 Billharz ................ H04L 63/104 713/153
2005/0060535 A1 * 3/2005 Bartas ..................... H04L 63/02 713/154
2005/0114490 A1 * 5/2005 Redlich ............... H04L 12/4633 709/223
2005/0114520 A1 * 5/2005 White ................. H04L 63/0209 709/228
2005/0114625 A1 * 5/2005 Snyder .................... H04L 41/08 712/1
2005/0114649 A1 * 5/2005 Challener ............... H04M 1/68 380/270
2005/0125689 A1 * 6/2005 Snyder .................. H04L 63/102 726/26
2005/0160280 A1 * 7/2005 Caslin ................... H04L 67/535 713/189
2005/0243984 A1 * 11/2005 Mahone .............. H04L 63/1408 379/114.01
2005/0249341 A1 * 11/2005 Mahone ................ H04L 67/535 713/189
2006/0031459 A1 * 2/2006 Ahn .................... H04L 12/2805 709/224
2006/0045267 A1 * 3/2006 Moore .................... H04L 63/20 380/247
2006/0253458 A1 * 11/2006 Dixon ................. H04L 63/1483
2006/0253545 A1 * 11/2006 Lakamp ................ G06F 16/435 709/217
2006/0253578 A1 * 11/2006 Dixon ..................... G06F 21/44 709/225
2006/0253580 A1 * 11/2006 Dixon ..................... G06F 21/51 709/225
2006/0253581 A1 * 11/2006 Dixon ..................... G06F 21/44 707/E17.107
2006/0253583 A1 * 11/2006 Dixon ..................... H04L 67/02 709/225
2006/0253584 A1 * 11/2006 Dixon ................. H04L 63/1441 709/225
2007/0055752 A1 * 3/2007 Wiegand ............. H04L 63/0892 709/220
2007/0100768 A1 * 5/2007 Boccon-Gibod ....... H04L 9/302 705/59
2007/0143827 A1 * 6/2007 Nicodemus ........... H04L 63/102 726/2
2007/0143837 A1 * 6/2007 Azeez ................... H04L 63/029 726/11
2007/0143851 A1 * 6/2007 Nicodemus ......... G06F 11/3495 726/4

(56) References Cited

U.S. PATENT DOCUMENTS

2007/0150732 A1* 6/2007 Suzuki .................. H04W 12/06 713/168
2007/0180485 A1* 8/2007 Dua ................ H04N 21/43615 725/74
2007/0185814 A1* 8/2007 Boccon-Gibod ..... H04L 9/3242 705/51
2007/0214263 A1* 9/2007 Fraisse .................... H04L 63/10 709/225
2007/0233845 A1* 10/2007 Song ................... H04L 12/2818 709/224
2007/0264973 A1* 11/2007 Dowek ................... H04L 63/20 455/411
2008/0112405 A1* 5/2008 Cholas .................. H04L 63/062 370/389
2008/0134267 A1* 6/2008 Moghe .................... H04L 63/10 725/112
2008/0159175 A1* 7/2008 Flack .................... H04L 67/306 370/257
2008/0209012 A1* 8/2008 Abujbara ................ H04L 67/06 709/219
2008/0263654 A1* 10/2008 Bahl ..................... H04L 67/563 726/15
2008/0270571 A1* 10/2008 Walker .................. H04L 63/083 709/218
2009/0070436 A1* 3/2009 Dawes ................... G06Q 50/16 709/219
2009/0070692 A1* 3/2009 Dawes ................ H04L 12/2818 715/764
2009/0083846 A1* 3/2009 Ding ..................... H04L 63/101 726/12
2009/0165114 A1* 6/2009 Baum ................. H04L 12/2809 726/12
2010/0023865 A1* 1/2010 Fulker .................... G08B 25/14 700/286
2010/0125894 A1* 5/2010 Yasrebi ............... H04L 12/2818 726/4
2010/0235880 A1* 9/2010 Chen ....................... H04L 12/66 726/1
2010/0245107 A1* 9/2010 Fulker ................... G06F 16/954 345/173
2010/0332615 A1* 12/2010 Short ................... G06Q 50/163 709/225
2011/0102171 A1* 5/2011 Raji .................... H04L 12/2803 340/541
2011/0128378 A1* 6/2011 Raji ...................... G06F 16/954 348/E5.022
2011/0208863 A1* 8/2011 Le Ber ................ H04L 61/4511 709/225
2011/0219229 A1* 9/2011 Cholas ...................... H04L 9/32 713/168
2011/0244798 A1* 10/2011 Daigle ............... G06Q 30/0226 455/41.2
2011/0247052 A1* 10/2011 Kim ...................... H04L 63/101 709/225
2012/0096159 A1* 4/2012 Short ...................... H04L 63/08 709/225
2012/0134291 A1* 5/2012 Raleigh ................. H04W 12/08 370/252
2012/0159575 A1* 6/2012 Fukui .................. H04L 63/0869 726/3
2012/0159642 A1* 6/2012 Bradley .............. H04L 63/0281 726/27
2012/0188072 A1* 7/2012 Dawes ................ H04L 12/2825 340/514
2012/0216241 A1* 8/2012 Alon ..................... H04L 63/029 726/1
2012/0254975 A1* 10/2012 Bugenhagen ......... H04L 63/102 726/11
2012/0278453 A1* 11/2012 Baum ................... H04L 67/125 709/220
2012/0278877 A1* 11/2012 Baum ..................... H04L 63/20 726/12
2012/0278889 A1* 11/2012 El-Moussa .......... H04L 63/1475 726/23
2013/0078947 A1* 3/2013 Pecen ................. H04L 63/1458 455/411
2013/0078948 A1* 3/2013 Pecen ................... H04L 63/123 455/411
2013/0078949 A1* 3/2013 Pecen ................... H04W 12/37 455/411
2013/0091534 A1* 4/2013 Gilde ...................... H04L 63/10 726/13
2013/0212615 A1* 8/2013 Schultz ................ H04N 21/441 725/25
2013/0227284 A1* 8/2013 Pfeffer ................ H04L 63/0236 713/168
2013/0298244 A1* 11/2013 Kumar .................... G06F 21/51 726/25
2014/0126425 A1* 5/2014 Burd ..................... G06F 16/972 370/255
2014/0167928 A1* 6/2014 Burd ................... H04L 12/2825 340/12.5
2014/0172957 A1* 6/2014 Baum .................. G08B 25/003 709/203
2014/0181893 A1* 6/2014 Von Bokern ........ H04L 63/0876 726/1
2014/0259092 A1* 9/2014 Boucher ............. H04L 63/0272 726/1
2014/0331119 A1* 11/2014 Dixon ................... G06F 21/567 715/234
2014/0344891 A1* 11/2014 Mullick ................ H04L 63/105 726/1
2014/0359101 A1* 12/2014 Dawes .................. G06F 3/0412 709/223
2015/0033021 A1* 1/2015 Tinnakornsrisuphap .................... H04L 63/0884 713/171
2015/0113172 A1* 4/2015 Johnson .................. H04L 67/75 709/245
2015/0143456 A1* 5/2015 Raleigh ................... H04L 63/20 726/1
2015/0156183 A1* 6/2015 Beyer ................... H04L 63/145 726/4
2015/0188949 A1* 7/2015 Mahaffey .............. H04W 12/37 726/1
2015/0256620 A1* 9/2015 Sugano ............... H04L 67/1095 709/217
2016/0004846 A1* 1/2016 Nakano ................ H04L 63/061 726/27
2016/0057141 A1* 2/2016 Van Den Broeck .. H04W 12/06 726/10
2016/0087933 A1* 3/2016 Johnson ................ H04W 12/35 709/245
2016/0112397 A1* 4/2016 Mankovskii .......... H04L 63/105 726/6
2016/0164835 A1* 6/2016 Hoffmann ........... H04L 63/0272 726/1
2016/0164923 A1* 6/2016 Dawes .................... H04L 63/02 709/227
2016/0173450 A1* 6/2016 Mircescu ................ H04L 63/02 726/14
2016/0212129 A1* 7/2016 Johnston ................. G06F 21/34
2016/0234222 A1* 8/2016 Rosberg ................ H04L 63/101
2016/0261616 A1* 9/2016 Shulman ................. H04L 63/10
2016/0316025 A1* 10/2016 Lloyd ................. H04L 63/0281
2016/0352718 A1* 12/2016 Caffary, Jr. ........... G06F 21/335
2017/0026382 A1* 1/2017 Trigger ................... H04L 63/20
2017/0052522 A1* 2/2017 Klein ...................... H04L 67/34
2017/0093910 A1* 3/2017 Gukal ................. H04L 63/1416
2017/0124303 A1* 5/2017 Baldwin ................. G06F 21/44
2017/0142094 A1* 5/2017 Doitch .................... G06F 21/41
2017/0149825 A1* 5/2017 Gukal ................. H04L 63/1491
2017/0180318 A1* 6/2017 Lutas ...................... H04L 63/14
2017/0185277 A1* 6/2017 Sundermeyer ...... G06F 3/04883
2017/0185278 A1* 6/2017 Sundermeyer ...... H04L 12/2818
2017/0186293 A1* 6/2017 Rabb ..................... H04L 63/102
2017/0214708 A1* 7/2017 Gukal ................... G06F 16/285
2017/0223046 A1* 8/2017 Singh .................. H04L 63/1491

(56) References Cited

U.S. PATENT DOCUMENTS

2017/0235955 A1* 8/2017 Barkan ............... H04L 63/0853 726/11
2017/0264639 A1* 9/2017 Sama .................... H04L 63/029
2017/0272316 A1* 9/2017 Johnson ............. H04W 12/068
2017/0289191 A1* 10/2017 Thioux ............... H04L 63/1441
2017/0302691 A1* 10/2017 Singh .................. H04L 63/1458
2017/0310705 A1* 10/2017 Gopalakrishna .... H04L 41/0886
2017/0310706 A1* 10/2017 Wu ....................... H04L 63/029
2017/0318053 A1* 11/2017 Singh .................. H04L 63/1425
2017/0329783 A1* 11/2017 Singh .................. H04L 63/1441
2017/0353324 A1* 12/2017 Baum ................... H04L 67/125
2017/0353491 A1* 12/2017 Gukal ................. H04L 63/1491
2018/0004377 A1* 1/2018 Kitchen ................ H04L 67/025
2018/0019890 A1* 1/2018 Dawes ................ H04L 12/2803
2018/0191720 A1* 7/2018 Dawes ................ H04L 12/2825
2018/0191740 A1* 7/2018 Decenzo ................. H04L 63/02
2018/0191741 A1* 7/2018 Dawes ................ H04W 12/069
2018/0191742 A1* 7/2018 Dawes .................... H04L 63/08
2018/0191807 A1* 7/2018 Dawes ................ H04L 12/2803
2018/0198756 A1* 7/2018 Dawes .................... G06F 21/00
2018/0198788 A1* 7/2018 Helen ................. H04L 12/2827
2018/0198821 A1* 7/2018 Gopalakrishna ...... G06F 21/566
2018/0248851 A1* 8/2018 Kaplan Haelion ... H04L 9/3268
2018/0262388 A1* 9/2018 Johnson ................. H04W 4/70
2018/0288098 A1* 10/2018 Wang .................. G06F 16/9024
2019/0007311 A1* 1/2019 Omar ...................... H04L 67/34
2019/0045021 A1* 2/2019 Burd .................. H04L 12/2825
2019/0051122 A1* 2/2019 Fulker ................. H04L 12/2803
2019/0058718 A1* 2/2019 Pangeni .............. H04L 63/1425
2019/0068617 A1* 2/2019 Coleman ............. H04L 63/0876
2019/0089742 A1* 3/2019 Hill ..................... H04L 63/1441
2019/0109818 A1* 4/2019 Baum .................... G08B 25/14
2019/0158353 A1* 5/2019 Johnson .............. H04L 63/0823
2019/0197879 A1* 6/2019 Raji ..................... G08B 25/008
2019/0245869 A1* 8/2019 Dawes .................... G06F 3/041
2019/0289134 A1* 9/2019 Dawes ................ H04L 12/2827
2019/0319945 A1* 10/2019 Levy ..................... H04L 63/205
2019/0384917 A1* 12/2019 Shah ....................... H04L 67/10
2020/0053111 A1* 2/2020 Jakobsson ........... H04L 63/1416
2020/0067937 A1* 2/2020 Ganapathy .............. H04L 63/10
2020/0076902 A1* 3/2020 Huang ................ H04L 63/0281
2020/0106784 A1* 4/2020 Dawes ................ H04W 12/068
2020/0119940 A1* 4/2020 Dawes ................... H04M 11/04
2020/0177590 A1* 6/2020 Levy ..................... H04W 12/10
2020/0177606 A1* 6/2020 Valluri ............... H04L 63/0227
2020/0296009 A1* 9/2020 Dawes ................ H04L 43/0817
2020/0351244 A1* 11/2020 Moore .................... H04L 63/20
2020/0358858 A1* 11/2020 Shribman ............. H04L 67/563
2020/0389458 A1* 12/2020 Huang .................... H04L 12/06
2020/0396255 A1* 12/2020 Smith ................... H04L 63/105
2021/0014269 A1* 1/2021 Devane ............... H04L 63/1483
2021/0014312 A1* 1/2021 Dawes ................ G06F 3/04886
2021/0051180 A1* 2/2021 Barnett ................... H04L 69/16
2021/0058395 A1* 2/2021 Jakobsson ............. H04L 67/306
2021/0092596 A1* 3/2021 Kudtarkar ............... H04L 63/20
2021/0367921 A1* 11/2021 Baum ...................... H04L 67/53
2022/0014512 A1* 1/2022 Raleigh ............... H04L 63/0823
2022/0021654 A1* 1/2022 Trentini .............. H04L 63/0272
2022/0028249 A1* 1/2022 Saldin .............. G08B 13/19656
2022/0057917 A1* 2/2022 Fulker ..................... H04L 67/62
2022/0060474 A1* 2/2022 Trentini .............. H04L 63/0236
2022/0070262 A1* 3/2022 Kitchen .............. H04L 12/2803
2022/0078229 A1* 3/2022 Kitchen ................ H04L 67/125
2022/0116356 A1* 4/2022 Baum .................... G08B 25/08
2022/0141048 A1* 5/2022 Dawes ................. G08B 25/008 340/506
2022/0150274 A1* 5/2022 Sheridan ................. H04L 63/02
2022/0197306 A1* 6/2022 Cella ................... H04L 63/1441
2022/0239696 A1* 7/2022 Konda ................ H04L 61/4511
2022/0272110 A1* 8/2022 Agrawal ............. H04L 63/1425
2022/0272179 A1* 8/2022 Decenzo ................ G06Q 50/26
2022/0321362 A1* 10/2022 Konda .................... G06F 21/57
2022/0394046 A1* 12/2022 Bryan ................. G06F 3/04817
2022/0407867 A1* 12/2022 Rathi .................... H04W 12/08
2023/0011484 A1* 1/2023 Decenzo ............. H04W 36/302
2023/0039576 A1* 2/2023 Baum ................. H04L 12/2818
2023/0045914 A1* 2/2023 Ru ...................... H04L 12/2834
2023/0086344 A1* 3/2023 Dawes ............. G08B 13/19678 715/765
2023/0097984 A1* 3/2023 Rola ....................... H04L 67/02 726/26
2023/0171319 A1* 6/2023 Ota ..................... H04L 63/0869 709/201
2024/0015039 A1* 1/2024 Dussaume ............ H04W 12/06
2024/0095320 A1* 3/2024 Balasubramanya ......................... H04L 63/0807
2024/0146754 A1* 5/2024 Bastos ................ H04L 63/1425
2024/0163288 A1* 5/2024 Burghoorn ............ H04L 63/101
2025/0317419 A1* 10/2025 Narayanaswamy .... H04L 67/02
2025/0324260 A1* 10/2025 Ranade ............... H04L 63/0227

OTHER PUBLICATIONS

Al-Shaboti et al “Towards Secure Smart Home IoT: Manufacturer and User Network Access Control Framework,” IEEE Computer Society, pp. 892-899 (Year: 2018).*

Luo et al “TNC-Compatible NAC System Implemented on Network Processor,” IEEE Computer Society, pp. 1069-1075 (Year: 2007).*

Deng et al TNC-UTM: A Holistic Solution to Secure Enterprise Networks, IEEE Computer Society, pp. 2240-2245 (Year: 2008).*

Office Action for Korean Patent Application No. 10-2022-0157105, mailed on Feb. 8, 2023.

* cited by examiner

【FIG. 1】
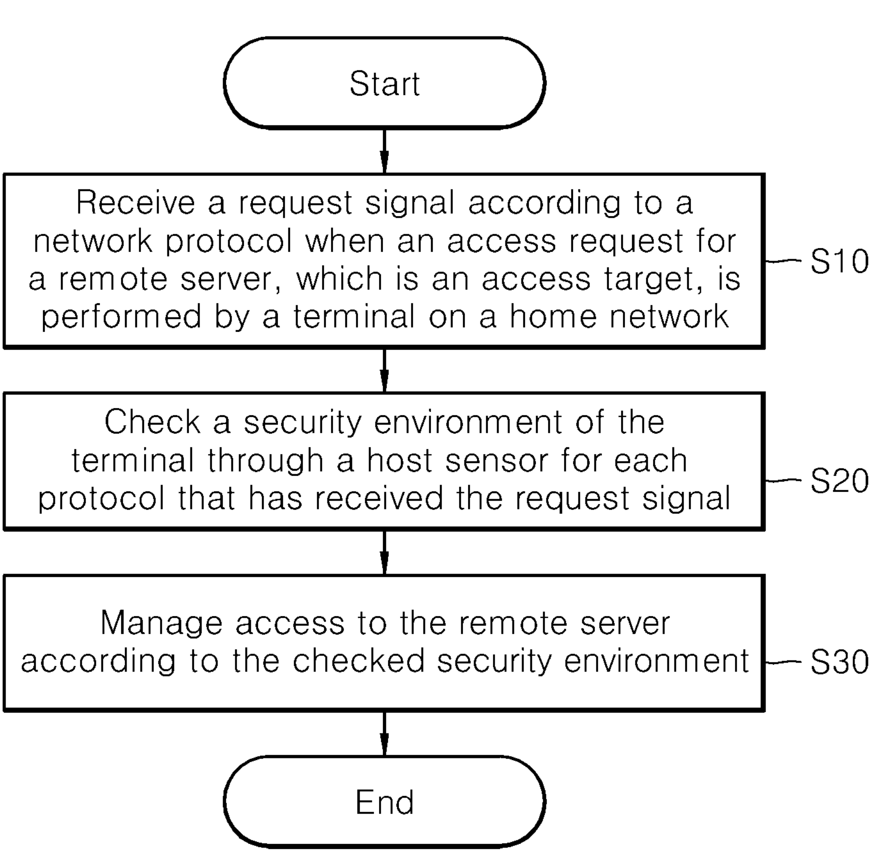

【FIG. 2】
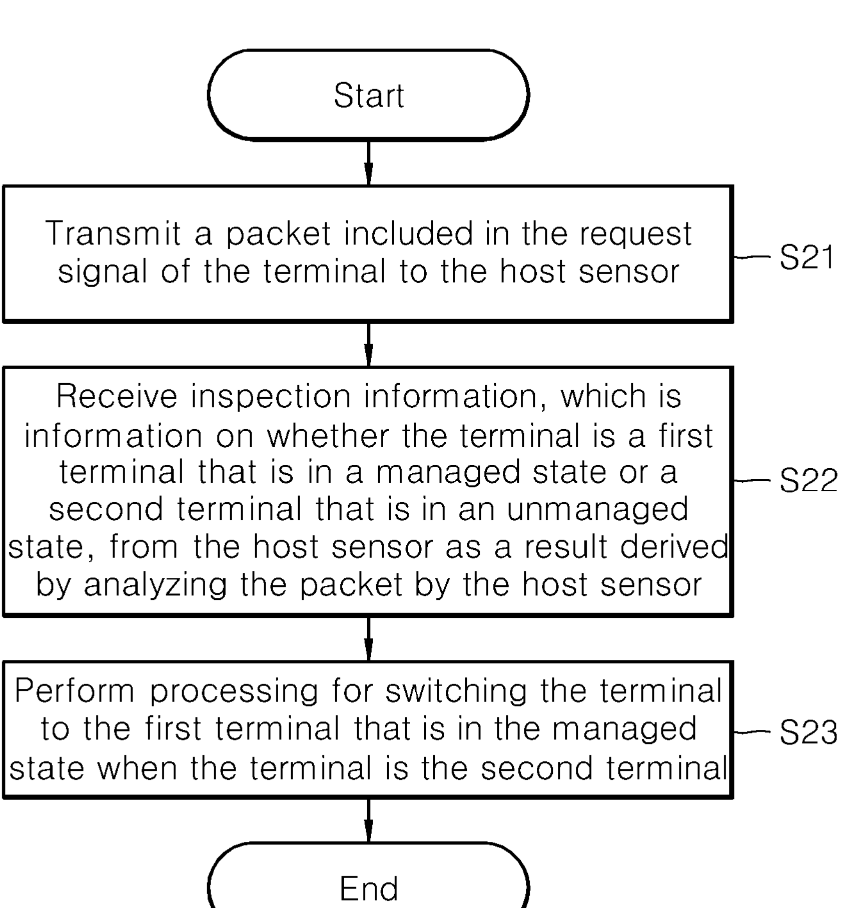

【FIG. 3】
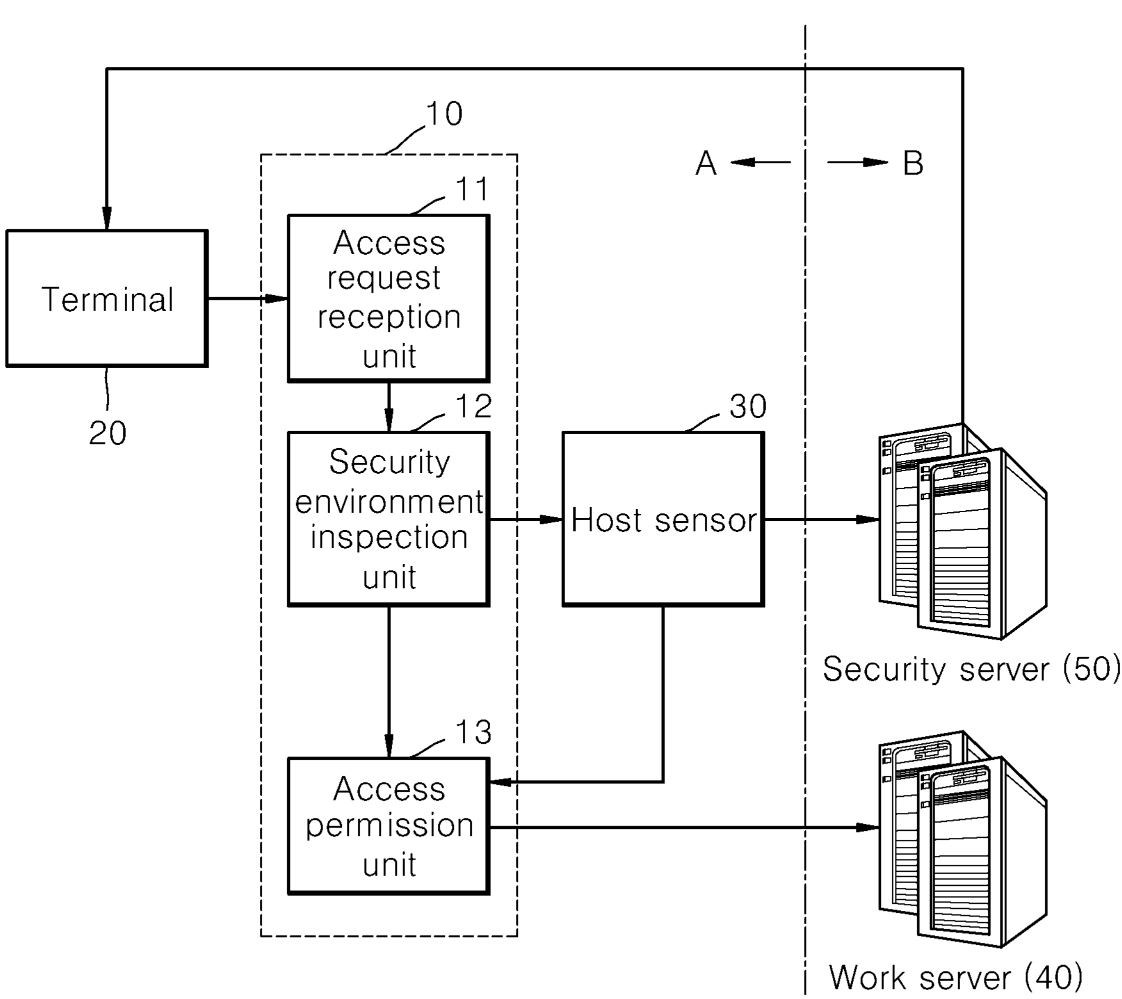

【FIG. 4】
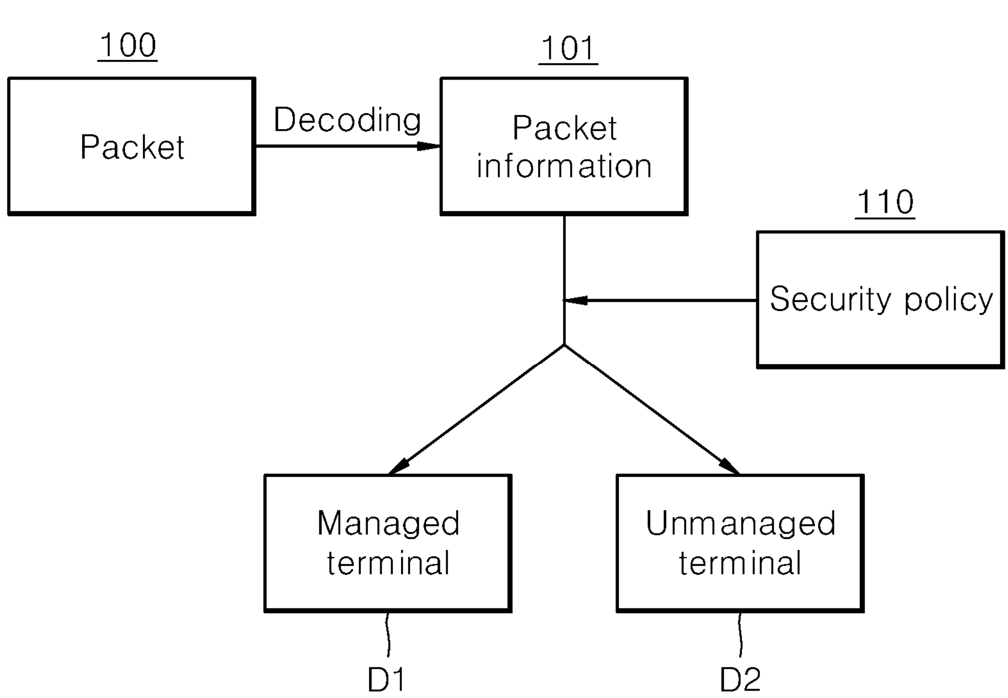

【FIG. 5】
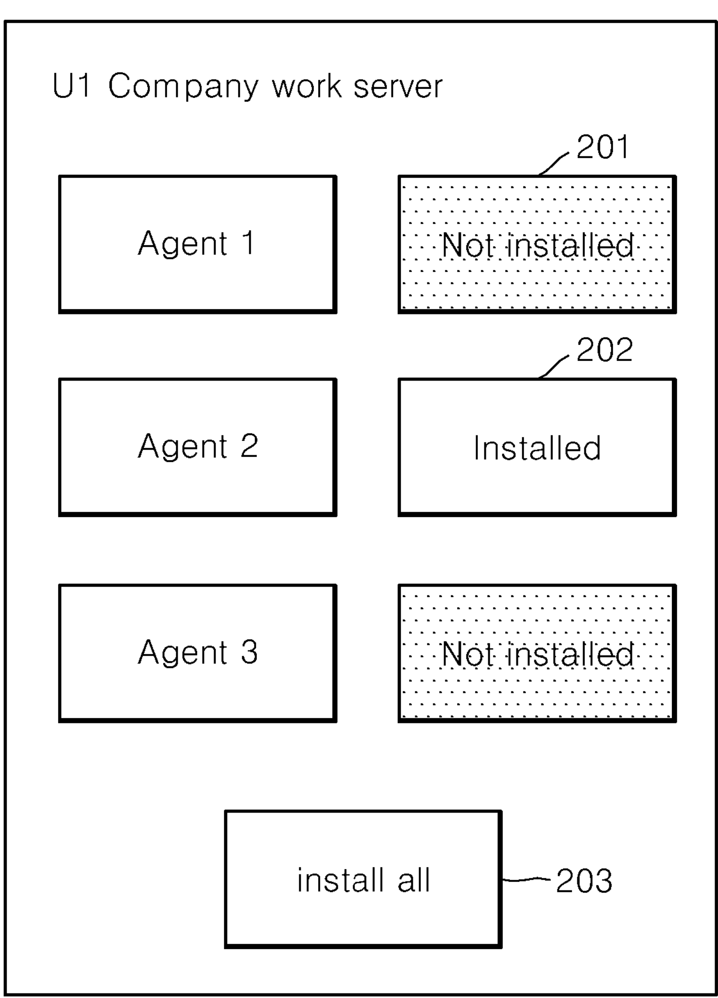

【FIG. 6】
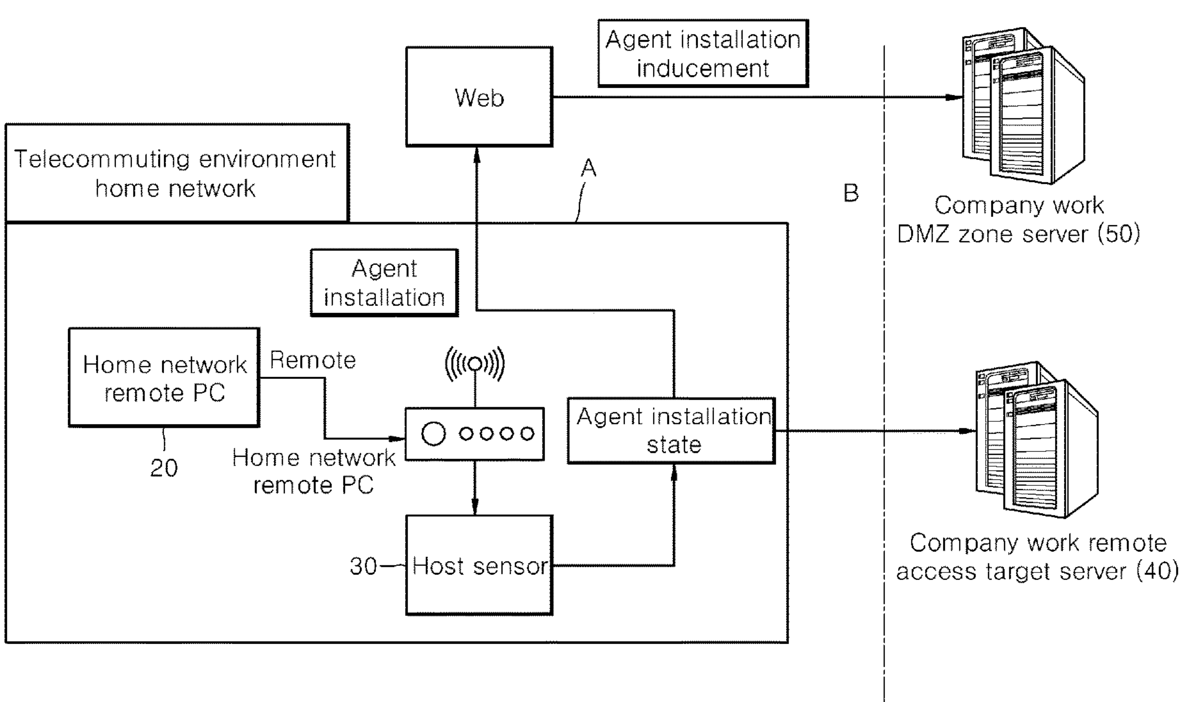

【FIG. 7】
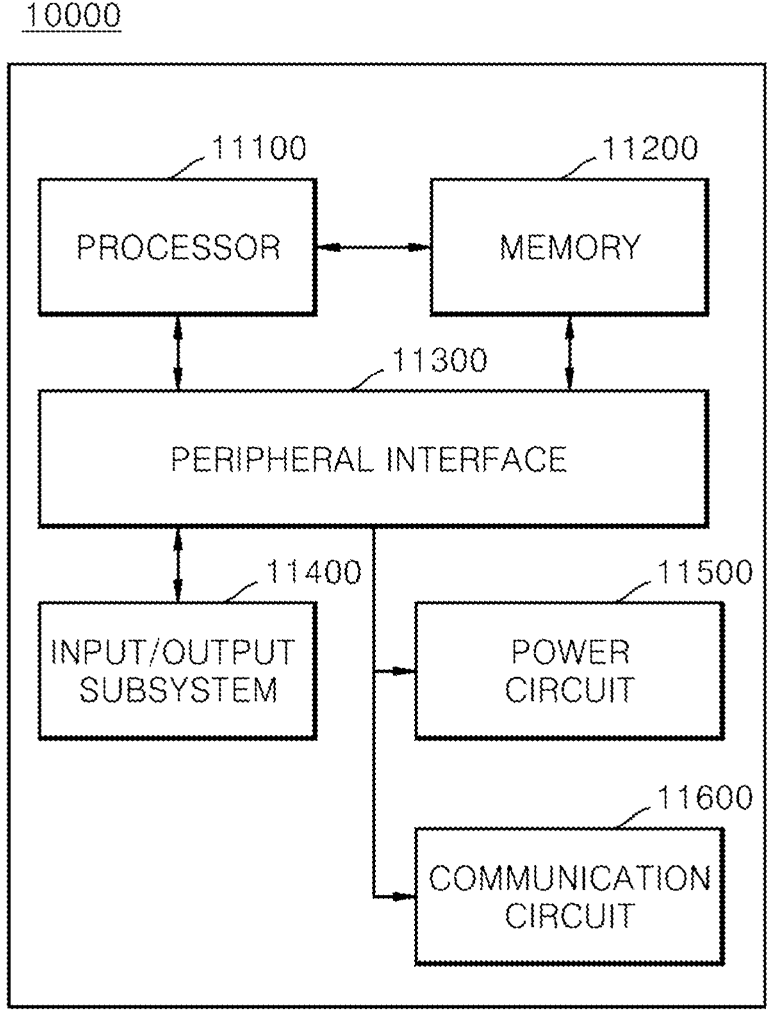

METHOD, APPARATUS, AND COMPUTER-READABLE RECORDING MEDIUM FOR CONTROLLING ACCESS TO REMOTE SYSTEM IN HOME NETWORK ENVIRONMENT

BACKGROUND OF THE INVENTION

1. Field of the Invention

The present invention relates to a technology for controlling safe access to a terminal on a home network in an internal work system of a company in an environment in which the terminal accesses a remote server through a home network environment, such as telecommuting, and more particularly, to a technology for enabling smooth remote access while maintaining security of an internal work system of a company by inspecting a security environment of a terminal and inducing improvement of the security environment through the inspection.

2. Description of the Related Art

Recently, telecommuting is a form of work that is being applied to many companies as flexibility and efficiency of a work have been proven, a non-face-to-face meeting platform, an electronic payment system, and the like have been developed, and infectious diseases and the like have been spread. The telecommuting refers to a technology of allowing a worker to perform a work at home or in other network environments, and to upload a work execution result to a server of a company or perform the work on the server of the company.

Since such a technology includes a characteristic that a remote home network terminal has no alternative but to access an in-house work server of a company, which has to ensure security, through a network that does not ensure security, rather than using a terminal and an internal network that ensure security in the company, security of the technology may be greatly threatened.

In the past, such access to the work server of the company through a remote home network has been managed simply with an ID, a password, and the like only, so that only a basic security agent is installed in a remote terminal, and it is general for the remote terminal to perform the access in a state where a security network environment of the company is not ensured for the remote terminal, and thus the remote terminal is inevitably exposed to threats such as hacking. Accordingly, risks such as leakage of company secrets have always been pointed out, and actual damages such as technology leakage have occurred.

Accordingly, for example, Korean Patent Registration No. 10-1460106 and the like have disclosed a technology for forming IPsec security tunneling in a path on a network leading to a gateway (BYOD gateway) according to access policy information used when accessing a company service server, and allowing a terminal to perform access through the IPsec security tunneling.

However, such technologies only improve security on a network basis, so that the remote terminal is still exposed to a risk of hacking. When the remote terminal has a malicious program such as malware, or the terminal has been hacked, hacking may be possible by accessing the company server through a security network, so that it is necessary to prepare for such hacking.

SUMMARY OF THE INVENTION

Accordingly, an object of the present invention is to provide a technology for effectively managing access of a home network terminal to a work server in a telecommuting environment to maintain security of the terminal, so that it is possible to prepare for all threats to work servers of companies, and in particular, it is possible to respond to and prepare for security threats to the terminal.

To achieve the object described above, according to one embodiment of the present invention, there is provided a method for controlling access to a remote system in a home network environment, which is implemented by a computing device including at least one processor and at least one memory for storing instructions executable by the processor, the method including: an access request reception step of receiving a request signal according to a network protocol when an access request for a remote server, which is an access target, is performed by a terminal on a home network; a security environment inspection step of checking a security environment of the terminal through a host sensor for each protocol that has received the request signal through the access request reception step; and an access permission step of managing access to the remote server according to the security environment checked according to a result of performing the security environment inspection step.

The security environment inspection step may include: a packet transmission step of transmitting a packet included in the request signal of the terminal to the host sensor; an inspection step of receiving inspection information, which is information on whether the terminal is a first terminal that is in a managed state or a second terminal that is in an unmanaged state, from the host sensor as a result derived by analyzing the packet by the host sensor; and a terminal processing step of performing processing for switching the terminal to the first terminal that is in the managed state when the terminal is the second terminal as a determination result of the inspection step.

The inspection information may be a result of decoding the packet and organizing packet information by the host sensor, determining whether a security agent to be installed in the terminal is installed according to a security policy set in the remote server based on the organized packet information, and determining a terminal in which all security agents are installed as the first terminal and a terminal in which the security agent is not installed as the second terminal.

The terminal processing step may include redirecting a packet of the second terminal to a security server for performing an installation process of the security agent according to the security policy set in the remote server, which is a server provided separately from the remote server, so as to control the terminal to access an installation page of the security agent.

The terminal processing step may include switching the second terminal to the first terminal when determined that the second terminal has accessed the security server to install all the security agents.

The access permission step may include permitting the access to the remote server only when the terminal is the first terminal.

Meanwhile, according to one embodiment of the present invention, there is provided an apparatus for controlling access to a remote system in a home network environment, which is implemented by a computing device including at least one processor and at least one memory for storing instructions executable by the processor, the apparatus including: an access request reception unit for receiving a request signal according to a network protocol when an access request for a remote server, which is an access target, is performed by a terminal on a home network; a security environment inspection unit for checking a security environment of the terminal by verifying the request signal received by the access request reception unit through a host sensor for each protocol; and an access permission unit for managing access to the remote server according to a security environment checking result of the security environment inspection unit.

According to the present invention, for a terminal that performs an access request to access an internal work server of a company, a host sensor may analyze a packet of a signal corresponding to the access request so as to control access to the work server depending on whether a security agent that has to be installed according to a company internal security policy is installed based on information of the packet.

In particular, a terminal in which the security agent that has to be installed according to the security policy is not installed may be set to an unmanaged state, the access may be redirected so as to access a security server for installing the security agent in the company and install the security agent, and the access to a remote work server may be permitted when the security agent is installed, so that security of the terminal can be maintained, and thus it is possible to prepare for all threats to work servers of companies, and in particular, it is possible to respond to and prepare for security threats to the terminal.

BRIEF DESCRIPTION OF THE DRAWINGS

FIGS. 1 and 2 are flowcharts showing a method for controlling access to a remote system in a home network environment according to one embodiment of the present invention.

FIG. 3 is a block diagram showing an apparatus for controlling access to a remote system in a home network environment according to one embodiment of the present invention.

FIG. 4 is a view for describing a function of a host sensor according to one embodiment of the present invention.

FIG. 5 shows an example of a security server access screen output to a second terminal according to one embodiment of the present invention.

FIG. 6 is a schematic diagram showing a network environment according to one embodiment of the present invention.

FIG. 7 shows one example of an internal configuration of a computing device according to one embodiment of the present invention.

DETAILED DESCRIPTION OF THE INVENTION

Hereinafter, various embodiments and/or aspects will be disclosed with reference to the drawings. In the following description, for the purpose of description, numerous specific details are set forth in order to facilitate an overall understanding of one or more aspects. However, it will also be appreciated by a person having ordinary skill in the art to which the present invention pertains that such aspect(s) may be practiced without the specific details. The following description and the accompanying drawings will be set forth in detail for specific illustrative aspects among the one or more aspects. However, the aspects are provided for illustrative purposes, some of various schemes based on principles of various aspects may be employed, and descriptions set forth herein are intended to include all the aspects and equivalents thereof.

The terms “embodiment”, “example”, “aspect”, “illustration”, and the like used herein may not be construed as indicating that any aspect or design set forth herein is preferable or advantageous over other aspects or designs.

In addition, it is to be understood that the terms “include” and/or “comprise” indicate the presence of corresponding features and/or elements, but do not preclude the presence or addition of one or more other features, elements, and/or groups thereof.

In addition, although the tams including ordinal numbers such as “first” and “second” may be used to describe various elements, the elements are not limited by the terms. The above terms are used merely for the purpose of distinguishing one element from another element. For example, a first element may be termed as a second element, and similarly, a second element may also be teamed as a first element without departing from the scope of the present invention. The term “and/or” includes any combination of a plurality of described relevant items, or one of the described relevant items.

In addition, unless defined otherwise, all terms used in embodiments of the present invention, including technical and scientific teams, have the same meaning as those commonly understood by a person having ordinary skill in the art to which the present invention pertains. Any terms as those defined in generally used dictionaries are to be interpreted to have the meanings consistent with the contextual meanings in the relevant field of art, and are not to be interpreted to have idealistic or excessively formalistic meanings unless explicitly defined in the embodiments of the present invention.

FIGS. 1 and 2 are flowcharts showing a method for controlling access to a remote system in a home network environment according to one embodiment of the present invention, FIG. 3 is a block diagram showing an apparatus for controlling access to a remote system in a home network environment according to one embodiment of the present invention, FIG. 4 is a view for describing a function of a host sensor according to one embodiment of the present invention, FIG. 5 shows an example of a security server access screen output to a second terminal according to one embodiment of the present invention, and FIG. 6 is a schematic diagram showing a network environment according to one embodiment of the present invention. In the following description, various embodiments and detailed configurations of the present invention will be described with reference to a plurality of drawings together.

Referring to the drawings of the present invention together as described above, it will be understood that a method for controlling access to a remote system in a home network environment according to one embodiment of the present invention may be performed by detailed configurations of an apparatus 10 for controlling access to a remote system in a home network environment (hereinafter referred to as “apparatus according to the present invention”), which will be described with reference to FIG. 3, or a computing device of FIG. 7. In other words, it will be understood that the apparatus 10 according to the present invention may be implemented as the computing device of FIG. 7, a portion of the computing device, or groupware of a plurality of computing devices, and the detailed configurations of the apparatus 10 according to the present invention may be classified according to a function of each of components that will be described below in a processor or a memory.

According to the method for controlling the access to the remote system in the home network environment of one embodiment of the present invention, first, the computing device may perform an access request reception step S10 of receiving a request signal according to a network protocol when an access request for a remote server, which is an access target, is performed by a terminal on a home network.

According to the present invention, the terminal on the home network may include all terminals that are installed in the home network environment to attempt to access a work server, which is a work-related server in a company internal network environment. For example, the terminal on the home network may include a personal PC, a smart phone, a smart pad, and all other network-accessible terminals. Basically, the terminal may access a remote work server by accessing a communication network through a gateway of the home network, and the work server may be present inside a physical or software firewall structure in the company internal network environment.

The home network environment may refer to construction of a network among various information devices inside the home. In more detail, the home network environment may refer to construction an environment in which information home appliances communicate with each other through a wired/wireless network inside the home and are mutually accessible through the Internet outside the home.

Basically, the home network environment may refer to a technology for remotely controlling and integrating all digital electronic products connected through the network, such as an Internet home appliance, a digital VRC, a DVD player, and security equipment. Although this system, which started with home automation in the 1980s, has formed a home automation market based on communication, video, crime prevention, disaster prevention, and remote control functions, it was difficult to use the system, and the system was expensive, so that the system has not been widely distributed. Currently, due to development of an Internet environment and a computer technology, a stage where convenience and efficiency may be maximized by controlling all electronic devices in the home is being reached. A residential environment as an IT house is being changed to allow operations of automatically requesting an after-sales service through a server for failures or errors of home appliances, ordering foods through the Internet when there is no food in a refrigerator, and the like.

A technology constituting the home network environment may include various application technologies, and a wireless technology capable of transmitting various signals without the need to lay a new line is being applied as a core. Currently, a wireless technology constituting the home network may include a wireless LAN technology, a wireless PAN technology, an ultra-wideband (UWB) technology, a wireless 1394 technology, a ZigBee technology, a home RF technology, and the like.

A networking technology may be broadly divided into wired and wireless technologies, in which the wired technology may include phone line, power line, Ethernet, IEEE 1394, and USB technologies, and IEEE 802.11x-series wireless LAN, home RF, Bluetooth, ultra-wideband, ZigBee, and hyper LAN technologies are emerging and developing as the wireless technology.

According to the present invention, the home network environment will be understood to collectively refer to all environments other than the company internal network environment in which a security network is formed by a firewall and the like, that is, a network environment that is accessible by a terminal from an outside of a company, including a network environment in the concept of the home network described above.

The remote server, which is the access target of the terminal, may basically refer to a server terminal in the company internal network environment that has to be accessed to allow the terminal to perform a work, or transmit a work execution result of the terminal to an inside of the company in a telecommuting environment. All data, which is a security target in the company, may be managed in the remote server, and the remote server may be basically protected through a security network such as a security agent and other hardware.

Company network security may refer to a series of strategies, processes, and technologies designed to protect a network of a company from unauthorized access and damage to a company internal server. Common threats to network data and infrastructure may include hackers, malware, viruses, and the like, all of which attempt to access, intrude, and modify the network. A top priority in network security is to prevent such threats from intruding the network to propagate through the network by controlling access.

Multiple defense lines may protect the network at and within an edge. Security may start with access control. Access of unauthorized users, devices, and data to the network may be managed through policies and controls. A firewall (hardware or software) may be another primary defense line, and may monitor and control traffics transmitted to and received from the network so as to separate the network from other untrusted networks (e.g. the Internet). In addition, the network security may identify and respond to network threats by using intrusion detection and intrusion prevention systems that analyze network traffics. One of important subcomponent of the network security is application security. Since web applications and software used by the company usually have vulnerabilities, the application security may protect the applications. Various other strategies and technologies may be used to maintain security in data centers, public clouds, and the like.

When the access request for the remote server is performed by the terminal, the apparatus according to the present invention may receive a request signal from the terminal according to the network protocol, which is used by the terminal according to the home network environment.

When the step S10 is performed, the apparatus according to the present invention may perform a security environment inspection step S20 of checking a security environment of the terminal through a host sensor for each protocol that has received the request signal for the access request.

According to the present invention, the host sensor for each protocol may be a hardware or software sensor connected to a gateway of the home network environment, and may perform a function of checking the security environment of the terminal by catching and analyzing the request signal corresponding to the access request.

In detail, through the embodiment shown in FIG. 2, the host sensor may check the security environment of the terminal, and perform processing on the terminal according to the checked security environment.

The terminal may be divided into a managed state and an unmanaged state according to the checking of the security environment, in which the managed state may refer to a state of the terminal in which the security environment is appropriate, and the unmanaged state may refer to a state of the terminal in which the security environment is inappropriate. When the terminal is determined to be in the managed state as a result of performing the step S20, the apparatus according to the present invention may perform an access permission step S30 of managing access to the remote server according to the checked security environment so as to normally permit the access to the remote server. However, in a case of the unmanaged state, processing for switching a state of the terminal to the managed state may be performed in the step S20 as will be described below.

The process will be described in detail below. First, the computing device, that is, the apparatus according to the present invention, may perform a packet transmission step S21 of transmitting a packet included in the request signal of the terminal to the host sensor.

The host sensor may determine whether the terminal is in the managed state or the unmanaged state, which is described above, by analyzing the packet. For example, as shown in FIG. 4, a packet 100 included in the request signal transmitted from the terminal may be analyzed. In other words, after the step S21 is performed, the apparatus according to the present invention may perform an inspection step S22 of receiving inspection information, which is information on whether the terminal is a first terminal that is in a managed state or a second terminal that is in an unmanaged state, from the host sensor as a result derived by analyzing the packet by the host sensor.

Thereafter, the apparatus according to the present invention may perform a terminal processing step S23 of performing processing for switching the terminal to the first terminal that is in the managed state when the terminal is the second terminal as a determination result of the step S22.

In addition, the inspection information may include a result of analyzing the packet included in the request signal by the host sensor. In detail, as shown in FIG. 4, the inspection information may refer to information on the security environment that may be derived from information on the packet as a result of decoding the packet for each protocol and organizing detailed information 101 on the packet by the host sensor.

In this case, the information on the security environment may refer to determination information on whether values in a detailed column and a format of the packet are set in the packet by a function of a security agent as a result of decoding the packet included in the request signal. In addition, an installation state of the security agent in the terminal may be determined through a scheme of identifying tags coupled to the beginning and end of the packet to identify a communication protocol, or the like.

As a specific example, a field such as SgaTrustStatus: SgaAgent=True may be added to an end of a request header, which is an Http header in the request signal from the terminal in which the security agent is installed, and the field may be added to the header by adding a function by a firewall of a host installed in the server. Accordingly, when the field exists, it may be determined that the agent has been installed, and when the field does not exist, it may be determined that a required security agent has not been installed.

In other words, the inspection information may be a result of determining a terminal in which all security agents, which are installation targets, are installed as a first terminal D1 and a terminal in which the security agent is not installed as a second terminal D2 according to a security policy 110 associated with an internal firewall of the company in order to access the company internal network environment. That is, the inspection information may be information indicating the state of the terminal that has performed the access request.

While performing the step S23, the apparatus according to the present invention may form a network zone that is exceptionally accessible by the second terminal in the company internal network environment as a so-called 'DMZ zone', and may induce the terminal to access the zone through a web environment. Such a zone may be referred to as a security server in the company internal network environment so as to be distinguished from the remote server.

In the step S23, the apparatus according to the present invention may redirect a packet of the second terminal to a security server for performing an installation process of the security agent according to the security policy set in the remote server, which is a server provided separately from the remote server, so as to control the terminal to access an installation page of the security agent, in addition to preventing the terminal from accessing the remote server by transmitting the packet of the second terminal to the remote server or the server.

For example, when the second terminal attempts to access the remote server, a web screen 200 as shown in FIG. 5 may be output as a result of performing the function described above. The web screen 200 may be a result of accessing the security server, and may include information on an installed (202) or not-installed (201) state of each of the security agents Agents 1 to 3 together with a menu item 203 for installing each of the security agents so as to induce installation of the security agent.

Thereafter, when the installation of all the security agents in the terminal is completed in the web environment, the step S30 may be performed again so that the terminal may access the remote server so as to be switched to a state in which telecommuting is enabled.

In other words, the apparatus according to the present invention may determine whether all the security agents are installed as a result of redirecting to the security server and accessing the security server while performing the step S23 through re-execution of the steps S10 and S20 after termination of the access to the security server, and may switch the state of the terminal from the second terminal to the first terminal when the host sensor determines that all the security agents are installed, or log information on the installation of the security agent is recognized. In other words, in the step S30, the access to the remote server may be permitted only when the terminal is the first terminal.

According to execution of the function described above, rather than simply inducing the installation of the security agent, the security agent, which is an installation target, in the company internal network environment according to the security policy of the company may be induced to be installed on the terminal for the access to the remote server associated with a work of the company in a telecommuting environment, and in particular, the host sensor may determine whether the terminal is in the managed state through packet analysis on all terminals. Accordingly, when compared with the conventional technologies such as a technology for forming a list of clients and permitting only access to the clients included in the list, restrictions on available terminals in constructing a telecommuting environment by a worker may be greatly reduced, and strong security may be maintained even when a range of available terminals becomes very wide.

FIG. 3 shows a view showing a configuration of the apparatus 10 according to the present invention described above. While describing the apparatus 10 according to the present invention, redundant descriptions of components corresponding to all the descriptions set forth above will be omitted.

Referring to FIG. 3, the apparatus 10 according to the present invention may include an access request reception unit 11, a security environment inspection unit 12, and an access permission unit 13. The access request reception unit 11 may perform a function of receiving a request signal according to a network protocol when an access request for a remote server 40 on a company internal network B, which is an access target, is performed by a terminal 20 on a home network A. In other words, the access request reception unit 11 may be understood as a configuration that performs all the functions mentioned in the step S10 described above.

The security environment inspection unit 12 may perform a function of checking a security environment of the terminal 20 by verifying the request signal received by the access request reception unit 11 through a host sensor 30 for each protocol. In addition, when the terminal 20 is determined as being the second terminal as described above, the security environment inspection unit 12 may perform a function of redirecting a packet of the terminal 20 to a security server 50 to allow the terminal 20 to access the security server 50, allowing a security agent according to a company security policy to be installed, and switching a state of the terminal 20 to a first terminal according to a result of the installation. In other words, the security environment inspection unit 12 may be understood as a configuration that performs all the functions mentioned in the steps S20, S21, S22, and S23 described above.

The access permission unit 13 may perform a function of managing access of the terminal 20 to the remote server 40 according to a security environment checking result of the security environment inspection unit 12. In other words, the access permission unit 13 may be understood as a configuration that performs all the functions mentioned in the step S30 described above.

Although such a network environment is shown in FIG. 3, a more realistically schematized result is shown in FIG. 6. Referring to FIG. 6, in a home network environment A of a telecommuting environment, a remote PC, that is, the terminal 20, may attempt to access the remote server 40 via the apparatus 10 according to the present invention, for example, a gateway in which the apparatus according to the present invention is installed through remote access. The access attempt may begin with transmission of the request signal described above. In this case, the host sensor 30 may check the security environment of the terminal 20 by decoding and analyzing a packet of the request signal according to execution of the function described above, in which when the security environment is appropriate, the access to the server 40 in a company internal network environment B may be permitted, and otherwise, access to the security server 50 corresponding to a company work DMZ zone may be induced through a web 51 so as to install the security agent.

FIG. 7 shows one example of an internal configuration of a computing device according to one embodiment of the present invention. In the following description, redundant descriptions of the embodiment corresponding to the above descriptions for FIGS. 1 to 6 will be omitted.

As shown in FIG. 7, a computing device 10000 may at least include at least one processor 11100, a memory 11200, a peripheral interface 11300, an input/output (I/O) subsystem 11400, a power circuit 11500, and a communication circuit 11600. In this case, the computing device 10000 may correspond to a user terminal A connected to a tactile interface device, or correspond to a computing device B described above.

The memory 11200 may include, for example, a high-speed random access memory, a magnetic disk, an SRAM, a DRAM, a ROM, a flash memory, or a non-volatile memory. The memory 11200 may include a software module, an instruction set, or other various data required for an operation of the computing device 10000.

In this case, access to the memory 11200 from other components such as the processor 11100 or the peripheral interface 11300 may be controlled by the processor 11100.

The peripheral interface 11300 may couple an input and/or output peripheral device of the computing device 10000 to the processor 11100 and the memory 11200. The processor 11100 may execute the software module or the instruction set stored in the memory 11200 to perform various functions for the computing device 10000 and process data.

The I/O subsystem 11400 may couple various input/output peripheral devices to the peripheral interface 11300. For example, the I/O subsystem 11400 may include a controller for coupling the peripheral device, such as a monitor, a keyboard, a mouse, a printer, or a touch screen or a sensor if necessary, to the peripheral interface 11300. According to another aspect, input/output peripheral devices may be coupled to the peripheral interface 11300 without passing through the I/O subsystem 11400.

The power circuit 11500 may supply a power to all or some of the components of the terminal. For example, the power circuit 11500 may include a power management system, at least one power source such as a battery or an alternating current (AC), a charging system, a power failure detection circuit, a power switcher or inverter, a power status indicator, or any other components for generating, managing, or distributing a power.

The communication circuit 11600 may use at least one external port to enable communication with other computing devices.

Alternatively, as described above, the communication circuit 11600 may include an RF circuit, if necessary, to transmit and receive an RF signal, also known as an electromagnetic signal, thereby enabling the communication with other computing devices.

The above embodiment of FIG. 7 is merely one example of the computing device 10000, and the computing device 10000 may have a configuration or arrangement that omits some of the components shown in FIG. 7, further includes an additional component that is not shown in FIG. 7, or combines at least two components. For example, a computing device for a communication terminal in a mobile environment may further include a touch screen, a sensor, and the like in addition to the components shown in FIG. 7, and the communication circuit 11600 may include a circuit for RF communication in various communication schemes (Wi-Fi, 3G, LTE, Bluetooth, NFC, Zigbee, etc.). The components that may be included in the computing device 10000 may be implemented as hardware, software, or a combination of both hardware and software including at least one integrated circuit specialized in signal processing or an application.

The methods according to the embodiment of the present invention may be implemented in the form of program instructions that may be executed through various computing devices, and may be recorded in a computer-readable medium. In particular, a program according to the present embodiment may be configured as a PC-based program or an application dedicated to a mobile terminal. An application to which the present invention is applied may be installed in a user terminal through a file provided by a file distribution system. For example, the file distribution system may include a file transmission unit (not shown) for transmitting the file according to a request from the user terminal.

The device described above may be implemented as a hardware component, a software component, and/or a combination of the hardware component and the software component. For example, the devices and components described in the embodiments may be implemented by using at least one general-purpose or special-purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to an instruction. A processing device may execute an operating system (OS) and at least one software application executed on the operating system. In addition, the processing device may access, store, manipulate, process, and generate data in response to the execution of the software. In some cases, one processing device has been described as being used for convenience of understanding. However, it will be appreciated by those skilled in the art that the processing device may include a plurality of processing elements and/or a plurality of types of processing elements. For example, the processing device may include a plurality of processors or one processor, and one controller. In addition, other processing configurations such as a parallel processor may also be possible.

The software may include a computer program, a code, an instruction, or a combination of at least one thereof, and may configure the processing device to operate as desired or instruct the processing device independently or collectively. In order for the software and/or data to be interpreted by the processing device or to provide an instruction or data to the processing device, the software and/or data may be permanently or temporarily embodied in any type of machine, component, physical device, virtual equipment, computer storage medium, or device. The software may be distributed over computing devices, which are connected through a network, so as to be stored or executed in a distributed manner. The software and data may be stored in at least one computer-readable recording medium.

The method according to the embodiment may be implemented in the form of a program instruction that may be executed through various computer mechanisms, and may be recorded in a computer-readable medium. The computer-readable medium may include a program instruction, a data file, a data structure, and the like, alone or in combination with each other. The program instruction recorded in the medium may be specially designed and configured for the embodiment, or may be publicly known and available to those skilled in the art of computer software. An example of the computer-readable recording medium includes magnetic media such as a hard disk, a floppy disk, and a magnetic tape, optical media such as a CD-ROM and a DVD, magneto-optical media such as a floptical disk, and a hardware device specially configured to store and execute a program instruction, such as a ROM, a RAM, and a flash memory. An example of the program instruction includes a high-level language code that may be executed by a computer by using an interpreter or the like, as well as a machine language code generated by a compiler. The hardware device may be configured to operate as at least one software module to perform the operations of the embodiments, and vice versa.

Although the above description has been made with reference to specific embodiments and drawings, various modifications and changes can be made by those skilled in the art from the above description. For example, even when the described techniques are performed in an order that is different from the described manner, and/or the described components such as systems, structures, devices, and circuits are coupled or combined in a form that is different from the described manner, or replaced or substituted by other components or equivalents, appropriate results may be achieved. Therefore, other implementations, other embodiments, and equivalents to the claims are also within the scope of the appended claims.

What is claimed is:

1. A method of controlling access to a remote system in a home network environment, which is implemented by a computing device including at least one processor and at least one memory for storing instructions executable by the processor, the method comprising:

receiving a request signal from a terminal on a home network via a network protocol the request signal requesting access to a remote server inspecting a security environment of the terminal through a host sensor by catching and analyzing the request signal; and managing access to the remote server based on the security environment, wherein the inspecting the security environment comprises:

transmitting a packet included in the request signal from the terminal to the host sensor;

receiving inspection information from the host sensor on whether the terminal is a first terminal having a first status or a second terminal having a second status, wherein the first status indicates a managed state having a set of all required security agents installed and the second status indicates an unmanaged state missing one or more of the required security agents; and changing an identification of the terminal from the second terminal to the first terminal upon sensing the missing one or more required security agents have been installed;

wherein the inspection information includes information on the security environment derived from the packet by decoding the packet for each protocol and organizing detailed information on the packet by the host sensor, in which the security environment information is: (1) determination information on whether values in a detailed column and a format of the packet are set in the packet by a function of a security agent as a result of decoding the packet and (2) a result of determining whether the security agent in the terminal is installed in accordance with a security policy set on the remote server and identifying the terminal as the first terminal or the second terminal;

wherein the changing the identification of the terminal from the second terminal to the first terminal comprises:

redirecting a packet of the second terminal to a security server, wherein the security server installs the security agent according to the security policy, said security server located separately from the remote server within a company internal network environment;

providing the second terminal access to an installation page, wherein the installation page provides necessary links or installers for the required security agents so that one or more of the missing security agents are installed on the second terminal;

providing the second terminal access to the remote server upon verifying that the second terminal has all necessary security agents installed via the installation page to access the remote server; and wherein the managing access to the remote server comprises permitting access to the remote server when the terminal is identified as the first terminal.

2. An apparatus configured to control access to a remote system in a home network environment, which is implemented by a computing device including at least one processor and at least one memory for storing instructions executable by the processor, the apparatus comprising:

an access request reception circuitry configured to receive a request signal from a terminal on a home network via a network protocol, the request signal requesting access to a remote server;

a security environment inspection circuitry configured to inspect a security environment of the terminal by verifying the request signal received through a host sensor; and an access permission circuitry configured to manage access to the remote server according to the inspected security environment, wherein the security environment inspection circuitry is configured to:

transmit a packet included in the request signal of the terminal to the host sensor;

receive inspection information from the host sensor on whether the terminal is a first terminal having a first status or a second terminal having a second status, wherein the first status indicates a managed state having a set of all required security agents installed and the second status indicates an unmanaged state missing one or more of the required security agents, from the host sensor analyzing the packet; and change an identification of the terminal from the second terminal to the first terminal upon sensing that the missing one or more required security agents have been installed;

wherein the inspection information includes information on the security environment derived from the packet by decoding the packet for each protocol and organizing detailed information on the packet by the host sensor, in which the information on the security environment is: (1) determination information on whether values in a detailed column and a format of the packet are set in the packet by a function of a security agent as a result of decoding the packet, and (2) a result of determining whether the security agent is installed in the terminal according to a security policy set on the remote server and identifying the terminal as the first terminal or the second terminal;

wherein the security environment inspection circuitry is further configured to:

redirect a packet of the second terminal to a security server that is configured to install the security agent according to the security policy set on the remote server, said security server located separately from the remote server in a company internal network environment;

provide the second terminal access to an installation page that is configured to provides necessary links or installers for the required security agents so that one or more of the missing security agents are installed on the second terminal;

provide the second terminal access to the remote server upon verifying that the second terminal has all necessary security agents installed via the installation page to access the remote server; and wherein the access permission circuitry is further configured to permit access to the remote server when the terminal is identified as the first terminal.

3. A non-transitory computer-readable recording medium, wherein the computer-readable recording medium stores instructions for allowing a computing device to perform:

receiving a request signal according to a network protocol when an access request for a remote server is performed by a terminal on a home network;

inspecting a security environment of the terminal through a host sensor for each protocol that has received the request signal; and managing access to the remote server according to the security environment inspected, wherein the inspecting the security environment comprises:

transmitting a packet included in the request signal from the terminal to the host sensor;

receiving inspection information from the host sensor on whether the terminal is a first terminal having a first status or a second terminal having a second status, wherein the first status indicates a managed state having a set of all required security agents installed and a second status indicates an unmanaged state missing one or more of the required security agents, from the host sensor; and changing an identification of the terminal from the second terminal to the first terminal upon sensing that the missing one or more required security agents have been installed;

wherein the inspection information includes information on the security environment derived from the packet by decoding the packet for each protocol and organizing detailed information on the packet by the host sensor, in which the security environment information is (1) determination information on whether values in a detailed column and a format of the packet are set in the packet by a function of a security agent as a result of decoding the packet, and (2) a result of determining whether the security agent in the terminal is installed according to a security policy set on the remote server and identifying the terminal as the first terminal or the second terminal;

wherein the changing the identification of the terminal from the second terminal to the first terminal comprises:

redirecting a packet of the second terminal to a security server, wherein the security server installs the security agent according to the security policy set on the remote server, said security server located separately from the remote server in a company internal network environment;

providing the second terminal access to an installation page, wherein the installation page provides necessary links or installers for the required security agents so that one or more of the missing security agents are installed on the second terminal;

providing the second terminal access to the remote server upon verifying that the second terminal has all necessary security agents installed via the installation page to access the remote server; and wherein the managing access to the remote server comprises permitting access to the remote server when the terminal is identified as the first terminal.

* * * * *